(12) United States Patent
Huang et al.

(10) Patent No.: US 8,305,353 B2
(45) Date of Patent: Nov. 6, 2012

(54) GLARE-RESISTANT TOUCH PANEL

(75) Inventors: Wei-Lung Huang, Fongshan (TW);
Ho-Hsing Yen, Kaohsiung (TW)

(73) Assignee: Mildex Optical Inc., Kaohsiung Hsien (TW)

( * ) Notice: Subject to any disclaimer, the term of this patent is extended or adjusted under 35 U.S.C. 154(b) by 515 days.

(21) Appl. No.: 12/565,286

(22) Filed: Sep. 23, 2009

(65) Prior Publication Data
US 2011/0069014 A1      Mar. 24, 2011

(51) Int. Cl.
*G06F 3/041* (2006.01)
(52) U.S. Cl. ....................................................... 345/173
(58) Field of Classification Search .................. None
See application file for complete search history.

(56) References Cited

U.S. PATENT DOCUMENTS

| | | | |
|---|---|---|---|
| 6,689,458 B1 * | 2/2004 | Mikoshiba et al. | 428/339 |
| 6,896,981 B2 * | 5/2005 | Iwabuchi et al. | 428/698 |
| 7,589,798 B2 * | 9/2009 | Takahata et al. | 349/12 |
| 2004/0239641 A1 * | 12/2004 | Takahata et al. | 345/173 |

* cited by examiner

*Primary Examiner* — K. Wong
(74) *Attorney, Agent, or Firm* — Muncy, Geissler, Olds & Lowe, PLLC

(57) ABSTRACT

A glare-resistant touch panel has a touch-sensing layer, a polarizing filter, a diffraction layer and an anti-reflection layer. The polarizing filter is mounted on the touch-sensing layer. The diffraction layer is mounted on the polarizing filter and splits lights into different polarized angles. The anti-reflection layer is mounted on the diffraction layer. With the diffraction layer, light polarized at a specific angle are split to be polarized at different angles and are allowed to partly pass through polarized sunglasses. Hence a sunglasses wearer can still see what the screen from the touch panel displays even if the sunglasses and the polarizing filter are oriented perpendicular to each other.

4 Claims, 3 Drawing Sheets

GLARE-RESISTANT TOUCH PANEL

BACKGROUND OF THE INVENTION

1. Field of the Invention

The present invention relates to a touch panel, especially to a glare-resistant touch panel having a linear polarizing filter for reducing glare, wherein screen lights of the touch panel remains viewable when a user is wearing polarized sunglasses.

2. Description of the Related Art

In order to achieve an anti-glare function, a conventional touch panel may have a polarizing filter mounted therein to reduce reflected and scattered lights.

However, when a person wearing polarized sunglasses tries to use an electronic device having such foregoing conventional touch panel, he may not be able to see the screen display of the touch panel when the polarized sunglasses and the polarizing filter in the touch panel are oriented perpendicular to each other. For example, with reference to FIG. 3, a polarizing filter (60) in the touch panel is set to be oriented at 0-degree while a lens of the polarized sunglasses (50) is set to be oriented at 90-degree. When screen lights meet the polarizing filter (60), only 0-degree polarized lights can pass through the polarizing filter (60). The 0-degree polarized lights are also blocked when meeting the lens of the 90-degree polarized sunglasses (50). Therefore, screen of a touch panel having a polarizing filter may not be viewable for a user wearing polarized sunglasses.

To overcome the shortcomings, the present invention provides a glare-resistant touch panel in order to mitigate or obviate the aforementioned problems.

SUMMARY OF THE INVENTION

The main objective of the present invention is to provide a glare-resistant touch panel having a linear polarizing filter for reducing glare, wherein screen lights of the touch panel remains viewable when a user is wearing polarized sunglasses.

The glare-resistant touch panel in accordance with the present invention comprises a touch-sensing layer, a polarizing filter, a diffraction layer, an anti-reflection layer. The polarizing filter is mounted on the touch-sensing layer. The diffraction layer is mounted on the polarizing filter and splits lights into different polarized angles. The anti-reflection layer is mounted on the diffraction layer. With the diffraction layer, lights polarized at a specific angle are split to be polarized at different angles and are allowed to partly pass through polarized sunglasses. Hence a sunglasses wearer can still see what the screen from the touch panel displays even if the sunglasses and the polarizing filter are oriented perpendicular to each other.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
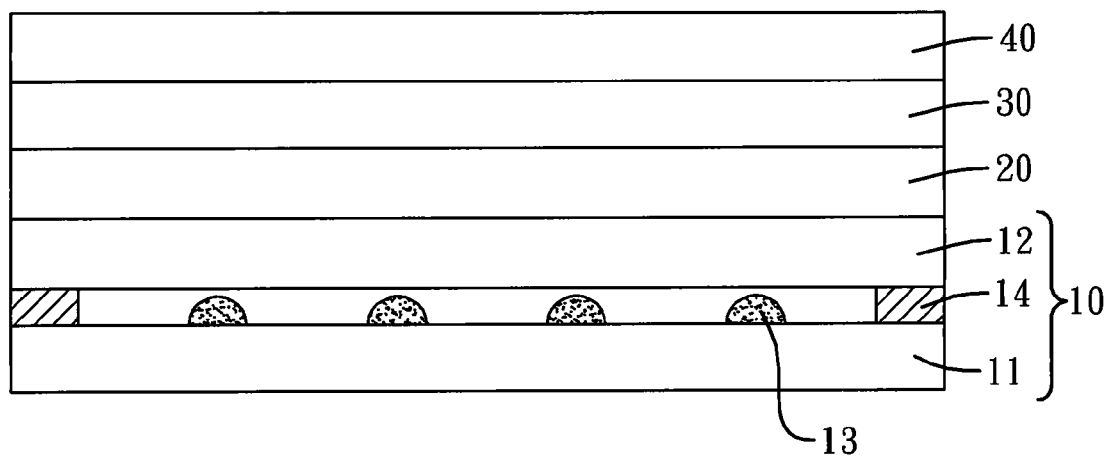
FIG. 1 is a cross sectional side view of a preferred embodiment of a glare-resistant touch panel in accordance with the present invention.

With reference to FIG. 1, a glare-resistant touch panel in accordance with the present invention comprises a touch-sensing layer (10), a polarizing filter (20), a diffraction layer (30) and an anti-reflection layer (40).

The touch-sensing layer (10) preferably has a lower conductive glass (11), an upper conductive film (12), multiple spacers (13) and double-sided tape (14). The upper conductive film (12) is mounted on the lower conductive glass (11). The spacers (13) are mounted between the lower conductive glass (11) and the upper conductive film (12). The double-sided tape (14) is disposed between the lower conductive glass (11) and the upper conductive film (12) around the spacers (13) to cohere the lower conductive glass (11) and the upper conductive film (12).

The polarizing filter (20) is mounted on the touch-sensing layer (10) to reduce glare. In this embodiment, the polarizing filter (20) is mounted on the upper conductive film (12).

The diffraction layer (30) is mounted on the polarizing filter (20) and splits lights into different polarized angles and may be a PET (Polyester) film.

The anti-reflection layer (40) is mounted on the diffraction layer (30) to reduce light reflection and increase light penetration.

Figure 2:
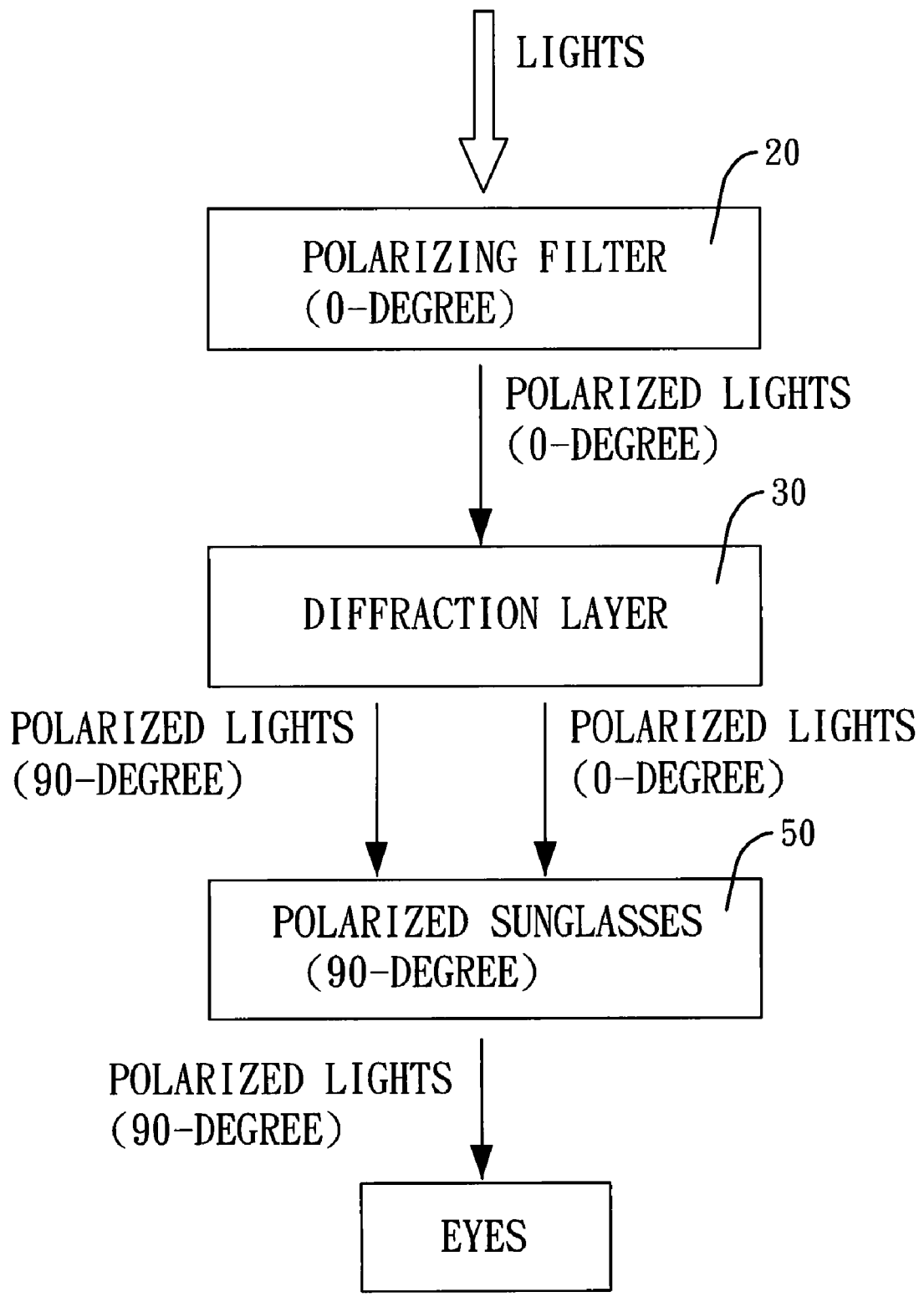
FIG. 2 is a diagrammatic representation of light meeting a polarizing filter, a diffraction layer of the present invention and polarized sunglasses in series.
Figure 3:
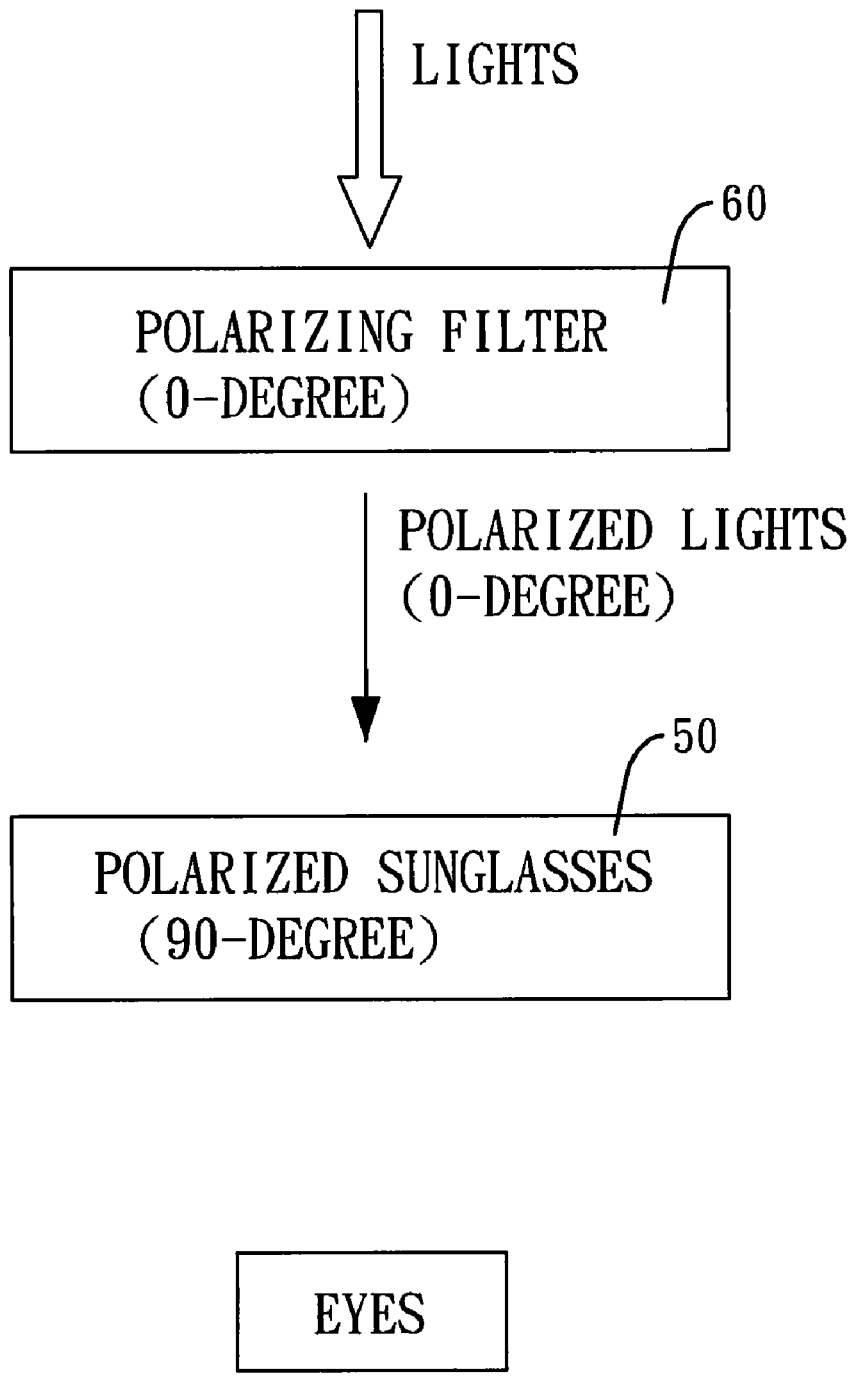
FIG. 3 is a diagrammatic representation of light meeting a polarizing filter of the prior art and polarized sunglasses in series.

With further reference to FIG. 2, when light transmitted through a bottom of the touch panel meets the polarizing filter (20), 0-degree polarized lights can pass through the polarizing filter (20) when the polarizing filter (20) is oriented at 0-degree. The 0-degree polarized lights passing through the polarizing filter (20) are split into different polarized angles by the diffraction layer (30), such as 0-degree and 90-degree. Therefore, once a lens of polarized sunglasses is oriented at 90-degree and only allows 90-degree polarized lights to pass through, the lights passing through the diffraction layer (30) will not be entirely blocked. The sunglasses wearer can still receive parts of the lights from the touch panel to see what the screen displays.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A glare-resistant touch panel comprising:
   a touch-sensing layer;
   a polarizing filter mounted on the touch-sensing layer and changing an input light passing through the polarizing filter to a first polarized light;
   a diffraction layer mounted on the polarizing filter and splitting the first polarized light into different lights with different polarized angles, wherein the polarizing filter in association with the diffraction layer only permits the lights with the different polarized angles to pass through the glare-resistant touch panel; and
   an anti-reflection layer mounted on the diffraction layer.

2. The glare-resistant touch panel as claimed in claim 1, wherein the diffraction layer is a PET (Polyester) film.

3. The glare-resistant touch panel as claimed in claim 1, wherein
the touch-sensing layer has
a lower conductive glass;
an upper conductive film mounted on the lower conductive glass;
multiple spacers mounted between the lower conductive glass and the upper conductive film; and
a double-sided tape disposed between the lower conductive glass and the upper conductive film around the spacers; and
the polarizing filter is mounted on the upper conductive film.

4. The glare-resistant touch panel as claimed in claim 2, wherein
the touch-sensing layer has
a lower conductive glass;
an upper conductive film mounted on the lower conductive glass;
multiple spacers mounted between the lower conductive glass and the upper conductive film; and
a double-sided tape disposed between the lower conductive glass and the upper conductive film around the spacers; and
the polarizing filter is mounted on the upper conductive film.

* * * * *